United States Patent
Kasparick et al.

(10) Patent No.: US 10,375,748 B2
(45) Date of Patent: Aug. 6, 2019

(54) METHOD FOR TERMINAL-TO-TERMINAL COMMUNICATION IN A CELLULAR MOBILE RADIO NETWORK, AND A SYSTEM THEREFOR

(71) Applicant: Bayerische Motoren Werke Aktiengesellschaft, Munich (DE)

(72) Inventors: Martin Kasparick, Berlin (DE); Slawomir Stanczak, Berlin (DE); Renato Luis Garrido Cavalcante, Berlin (DE); David Gozalvez Serrano, Munich (DE); Mladen Botsov, Munich (DE); Peter Fertl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/921,445

(22) Filed: Mar. 14, 2018

(65) Prior Publication Data

US 2018/0206280 A1   Jul. 19, 2018

Related U.S. Application Data

(63) Continuation of application No. PCT/EP2016/069852, filed on Aug. 23, 2016.

(30) Foreign Application Priority Data

Sep. 15, 2015   (DE) .................. 10 2015 217 568

(51) Int. Cl.
*H04W 72/08* (2009.01)
*H04W 76/14* (2018.01)
(Continued)

(52) U.S. Cl.
CPC ............. *H04W 76/14* (2018.02); *G06N 5/02* (2013.01); *H04B 17/309* (2015.01); *H04W 4/40* (2018.02); *H04W 72/082* (2013.01)

(58) Field of Classification Search
CPC ...... H04W 76/082; H04W 76/14; H04W 4/40
See application file for complete search history.

(56) References Cited

U.S. PATENT DOCUMENTS 9,125,071 B2 *   9/2015   Gao ...................... H04W 24/10
10,200,937 B2 *  2/2019   Chai .................... H04W 48/10
(Continued)

FOREIGN PATENT DOCUMENTS

| WO | WO 2012/019349 A1 | 2/2012 |
|----|-------------------|--------|
| WO | WO 2015/076867 A1 | 5/2015 |
| WO | WO 2015/099589 A1 | 7/2015 |

OTHER PUBLICATIONS

PCT/EP2016/069852, International Search Report dated Nov. 8, 2016 (Two (2) pages).

(Continued)

*Primary Examiner* — Rasheed Gidado
(74) *Attorney, Agent, or Firm* — Crowell & Moring LLP (57) ABSTRACT

A method for terminal-to-terminal communication in a cellular mobile radio network includes providing a radio signal interference map that is indicative of a location-dependent radio signal interference disturbance within a coverage area of a base station. The location-dependent radio signal interference disturbance is indicative of a radio signal interference disturbance of a terminal-to-terminal communication, and the radio signal interference map is based on a learning algorithm for a geographic radio signal interference map. Configuration information regarding a configuration setting of a radio transmission for a terminal-to-terminal communication between a first mobile radio communication terminal and a second mobile radio communication terminal is provided based on the location-dependent radio signal interference disturbance of the radio signal interference map. The configuration setting enables a statement regarding a configuration to be performed in respect of the radio transmis- (Continued)

sion. The method also includes setting up a terminal-to-terminal communication between the first mobile radio communication terminal and the second mobile radio communication terminal, taking into account of the provided configuration information regarding the configuration setting.

16 Claims, 3 Drawing Sheets

(51) Int. Cl.
    *H04B 17/309*     (2015.01)
    *H04W 4/40*     (2018.01)
    *G06N 5/02*     (2006.01)

(56) References Cited

U.S. PATENT DOCUMENTS

| | | |
|---|---|---|
| 2013/0150106 A1 | 6/2013 | Bucknell et al. |
| 2013/0294296 A1 | 11/2013 | Dimou et al. |
| 2014/0141789 A1* | 5/2014 | Tarokh .................. H04W 72/02 455/450 |
| 2015/0223257 A1 | 8/2015 | Wilhelmsson et al. |

OTHER PUBLICATIONS

German Search Report issued in German counterpart application No. 10 2015 217 568.5 dated Apr. 19, 2016, with Statement of Relevancy (Eight (8) pages).

* cited by examiner

METHOD FOR TERMINAL-TO-TERMINAL COMMUNICATION IN A CELLULAR MOBILE RADIO NETWORK, AND A SYSTEM THEREFOR

CROSS REFERENCE TO RELATED APPLICATIONS

This application is a continuation of PCT International Application No. PCT/EP2016/069852, filed Aug. 23, 2016, which claims priority under 35 U.S.C. § 119 from German Patent Application No. 10 2015 217 568.5, filed Sep. 15, 2015, the entire disclosures of which are herein expressly incorporated by reference.

BACKGROUND AND SUMMARY OF THE INVENTION

The present invention relates to a method for terminal-to-terminal communication in a cellular mobile radio network, and to a system therefor.

Cooperative intelligent transport systems (C-ITS) are based on the exchange of messages between vehicles, so-called vehicle-to-vehicle communication (V2V), and/or on the exchange of messages between vehicles and infrastructure units, so-called vehicle-to-infrastructure communication (V2I). Their goal is to increase traffic safety and traffic efficiency. Said exchange of messages or said communication is generally realized by means of wireless communication, for example by means of communication on the basis of a wireless local area network (WLAN) communication standard, such as, for example, on the basis of the IEEE 802.11p standard issued by the Institute of Electrical and Electronics Engineers (IEEE).

Most theoretical considerations concerning communication by means of cellular networks in this regard focus on cellular networks for a terminal-to-terminal communication, so-called "D2D-enabled cellular networks", and are principally concerned with establishing efficient protocols for direct communication. In this context, base stations have to exchange a multiplicity of control data with the D2D peers. In this case, it is always assumed that a connection between a base station and a mobile radio communication terminal is maintained in order to exchange said control data. This may be regarded as network-assisted terminal-to-terminal communication, thus as "network-assisted device-to-device communication" (aD2D). This approach promises a higher performance and reliability than the conventional ad-hoc communication, such as by means of IEEE 802.11p, for example.

Hitherto, however, a complete standard for aD2D communication has not yet been published or established. By way of example, resource allocation has been one of the greatest unsolved problems hitherto at the conceptual level. Most concepts for finding solutions here are based on the concept of "accumulating channel state information" for all connections in the system, at the base station. In order to ensure an efficient utilization of the radio resources here, the base stations require precise information about the status of the corresponding transmission channel in the network. In order furthermore to guarantee a sufficient reliability in critical application cases, D2D transmitters likewise require a specific knowledge regarding the transmission channel. In this context, the requirements made of C-ITS applications by means of aD2D communication in mobile communication systems and the ascertainment of precise knowledge regarding the transmission channel at the base stations are in competition with one another.

In this case, direct measurements of the channel may prove to be difficult, on account of the then large number of signal information items (such as, for example, the transmission of reference signals for the channel measurement and measurement protocols) that have to be exchanged between the base stations and the mobile radio communication terminals. Furthermore, a suitable design is demanded in order to avoid frequency collisions between D2D and cellular reference signals from neighboring cells.

Generally, it may become extremely difficult to effect sufficiently good implementation of channel measurements and corresponding measurement protocols for all D2D pairs and cellular mobile radio communication terminals in the cell if the number of mobile radio communication terminals in a far cell increases in the future. In the case of the mobile radio communication terminals, it may be even more challenging to obtain reliable channel estimations at the base station for the D2D communication pairs, as a result of a channel to be propagated highly dynamically. It can be deduced from this that a regulation for C-ITS applications by means of network-controlled D2D communication, from the technical side, has not yet been sufficiently clarified.

Therefore, it would be desirable to provide a possibility which reliably enables a reliable D2D communication, on the basis of cellular mobile radio networks.

It is an object of the invention to propose a possibility which avoids or at least reduces at least some of the disadvantages known in the prior art.

The invention relates to a method for terminal-to-terminal communication in a cellular mobile radio network, in particular for a cooperative intelligent transport systems communication, the method comprising the following steps:

providing a radio signal interference map, wherein the radio signal interference map is indicative of a location-dependent radio signal interference disturbance within a coverage area of a base station, wherein the location-dependent radio signal interference disturbance is indicative of a radio signal interference disturbance of a terminal-to-terminal communication, and wherein providing the radio signal interference map is carried out on the basis of a learning algorithm for a geographic radio signal interference map, providing configuration information regarding a configuration setting of a radio transmission for a terminal-to-terminal communication between a first mobile radio communication terminal and a second mobile radio communication terminal, wherein providing the configuration information is carried out on the basis of the location-dependent radio signal interference disturbance of the radio signal interference map, and wherein the configuration setting enables a statement regarding a configuration to be performed in respect of the radio transmission, and setting up a terminal-to-terminal communication between the first mobile radio communication terminal and the second mobile radio communication terminal, taking account of the provided configuration information regarding the configuration setting.

In this case, the method steps can be performed in an automated manner.

A location-dependent radio signal interference disturbance within the meaning of the invention here can be an interference disturbance of an electromagnetic radio wave, wherein the interference disturbance is location-dependent and therefore generally not constant in the coverage area of a base station.

A radio signal interference disturbance of a terminal-to-terminal communication within the meaning of the invention here means that the interference disturbance of the radio signal can concern a terminal-to-terminal communication, in particular.

A learning algorithm for a geographic radio signal interference map within the meaning of the invention here can mean an algorithm in which firstly the interference is always learned or determined, for example as an estimated value. It is only afterward, on the basis of this information, that a channel condition is estimated, such as, for example, a channel quality of the communication channel utilized for the terminal-to-terminal communication, that is to say the D2D communication.

This learning approach can be divided into two components, the learning of the location-dependent interference disturbance and, on the basis thereof, the channel estimation for the D2D communication. In this case, the learning of the interference disturbance is carried out at the base station, whereas the measurements for ascertaining the interference disturbances are performed by the D2D subscribers and communicated to the base station.

The learning approach can be summarized at the conceptual level as follows: instead of taking account of the interference and hence interference disturbances experienced by a pair of communication subscribers, a geographic interference map is created. In this case, each coordinate in the map is assigned an interference value or interference disturbance value. This value may be interpreted here as the interference or interference disturbance which a D2D communication subscriber typically experiences, that is to say experiences on average, when moving along the geographic locations on the map.

A second step is the utilization of the interference map which has been learned by the base station. This step comprises ascertaining the estimation of the channel condition of the channel utilized by the D2D communication subscribers. For this estimation it may be assumed that for this purpose it is possible to have recourse to the measurement values of the D2D communication subscribers in the system.

Configuration information regarding a configuration setting of a radio transmission within the meaning of the invention here can mean information suitable for informing a communication terminal of how a desired radio transmission for a terminal-to-terminal communication should be established. This can be carried out for example by means of a prediction which exhibits probabilities and enables a statement about the quality of the radio channel to be utilized for the radio transmission. Consequently, the configuration information can be prediction information and the configuration setting for the radio transmission can correspondingly be a channel quality condition for the radio channel to be utilized for the radio transmission. The channel quality condition can then be a statement about a channel damping regarding the radio channel.

In the case of network-supported terminal-to-terminal communication, the base station can also communicate information as to how the direct transmission including transmitter power and/or modulation should be configured. As a result, the base station can communicate this configuration instead of the prediction of the channel quality, or else in addition to the prediction of the channel quality, to the relevant communication terminals.

A terminal-to-terminal communication within the meaning of the invention here can mean a communication in a cellular mobile radio telecommunication network in which at least two mobile radio communication devices communicate directly with one another. In this case, however, the communication is not exclusively limited to two subscribers, but rather can also comprise a third or even further subscribers. By way of example, a terminal-to-terminal communication can also comprise a broadcast communication in which a terminal directly communicates broadcasting information to further terminals.

A terminal-to-terminal communication can mean that in principle there may be the possibility of carrying out broadcast transmissions by the transmission being configured in accordance with the device with the poorest quality conditions.

The mobile radio communication terminal within the meaning of the invention here can be a mobile radio communication device, but—in contrast to an arbitrary mobile radio communication device connected to a base station—one which is designed for terminal-to-terminal communication.

The teaching according to the invention affords the advantage that it is possible to provide a terminal-to-terminal communication in a cellular mobile radio communication network for at least two mobile radio communication terminals, such as is required for a D2D-based communication for C-ITS applications.

A further advantage is that as a result there is no longer a need for channel measurements and corresponding measurement protocols for all D2D pairs and cellular mobile radio communication terminals in the cell.

In the case of a cooperative intelligent transport systems communication, the terminal-to-terminal communication can be designed to enable a direct vehicle-to-vehicle communication and/or a direct vehicle-to-infrastructure communication. Direct here means that, in the cellular mobile radio communication network, the base station is only accorded the importance of making statements about a communication channel and/or the communication subscribers in order to enable the terminal-to-terminal communication. In this case, such statements may be channel quality information, an indication of how transmission, reception and/or channel selection should be performed, or else subscriber information, that is to say in the case of broadcasting, for example, which subscribers would like to participate in the corresponding broadcasting. However, the base station is no longer needed for carrying out the actual communication between the subscribers; consequently, the base station no longer carries out routing of the communication data.

The subject matter of an alternative independent claim relates to a system for terminal-to-terminal communication in a cellular mobile radio network, the system comprising a base station of a mobile radio system, a first mobile radio communication terminal, and a second mobile radio communication terminal. In this case, the base station is designed to provide terminal-to-terminal mobile radio communication devices connected to the base station with corresponding information, regarding configuration information, regarding a configuration setting of a radio transmission for a terminal-to-terminal communication. Furthermore, the system is configured to implement a method according to the invention.

In this case, configuring and/or setting up the D2D communication connection can be performed by the base station of the cell, whereas the communication data can be transmitted directly, that is to say without a detour via the base station, from one D2D communication subscriber to the other further communication subscriber or communication subscribers participating in the D2D communication connection.

The teaching according to the invention affords the advantage that it is possible to provide a terminal-to-terminal communication in a cellular mobile radio communication network for at least two mobile radio communication terminals, such as is required for a D2D-based communication for C-ITS applications.

A further advantage is that there is no need for cost-intensive upgrading or new installation of the base station present and required in an existing cellular mobile radio communication network.

Yet another advantage is that a better performance can be achieved, through a centralized coordination and configuration of transmissions, since the central coordination and configuration unit has more information.

The subject matter of a further alternative independent claim relates to a computer program product for a system, wherein the system is operable according to a method according to the invention.

The teaching according to the invention affords the advantage that the method can be implemented particularly efficiently in an automated manner.

The subject matter of a further alternative independent claim relates to a data carrier comprising a computer program product according to the invention.

The teaching according to the invention affords the advantage that the method can be distributed and/or kept available particularly efficiently among the devices and/or systems implementing the method.

Before embodiments of the invention are described more thoroughly below, firstly it should be emphasized that the invention is not restricted to the components described or the method steps described. Furthermore, the terminology used does not constitute any restriction either, but rather has only exemplary character. Insofar as the singular is used in the description and the claims, in each case the plural is concomitantly encompassed here, unless this is explicitly precluded by the context. Any possible method steps can be performed in an automated manner, unless this is explicitly precluded by the context.

Further exemplary embodiments of the method according to the invention are explained below.

In accordance with a first exemplary embodiment, the method furthermore comprises the fact that providing the radio signal interference map is carried out on the basis of received signal strength indication information.

Received signal strength indication information within the meaning of the invention here can mean information which represents an indicator of the received field strength of wireless communication applications and is also called RSSI. Since the RSSI does not have a defined unit, the value has to be interpreted depending on the respective application. There are various definitions even within the "Institute of Electrical and Electronics Engineers", also called IEEE, 802.11 standard, wherein a higher value corresponds to better reception. In measurement receivers, the RSSI value can also be output as an analog voltage at a dedicated terminal for further processing. With a device-dependent scaling factor, the RSSI value can be expressed as a power level in the dimensionless unit dBm. This indicator is required by mobile radio telephones, radio-frequency modules and other systems that rely on radio communication, in order to find a channel that is usable for the communication. If the signal strength required for a successful communication is undershot on the channel currently being utilized, it is possible to change to a better channel, if appropriate, with the aid of the RSSI value.

In this case, the RSSI information is important for the summation of all received energy distributions, also called "received power contributions", and may be interpreted here as an estimation of the total interference. In this case, interference estimations can be generated by means of a learning algorithm used. This can be carried out thereby even for geographic locations at which no measurement values are available. If there are sufficient interference measurement values around such a location and the learning algorithm has been trained as it were well enough, these interference estimation values can indeed likewise be regarded as reliable.

In order to enable this learning, that is to say in order to be able to generate a geographic interference map from the interference measurement values of the D2D communication subscribers, it is possible to utilize machine learning programs, also called "machine learning tools", which are already publically available. Two such exemplary methods are adaptive projected subgradient method based algorithms, also called APSM algorithms, and multi-kernel approaches.

This embodiment has the advantage that measurement data such as are provided on the basis of corresponding protocols in the cellular mobile radio communication system can be utilized for the learning of the interference map. Consequently, no additional measurements are required, as a result of which resources can be saved.

In accordance with a further exemplary embodiment, the method furthermore comprises the fact that providing the radio signal interference map is carried out on the basis of measurement information from mobile radio communication devices connected to the base station, such as are provided at least in a long term evolution standard, in particular in a 4G standard and/or 3.9G standard.

A long term evolution standard within the meaning of the invention here may be a long term evolution standard of a cellular mobile radio communication network, abbreviated to LTE or else 3.9G. This is a designation for a 3.9G standard in the context of 3GPP, which does not completely fulfill the 4G definitions of the "Telecommunication Standardization Sector", also called ITU-T. This standard is nevertheless promoted as 4G for marketing reasons. The planned successor of LTE is the IMT-advanced 4G mobile radio standard called LTE-advanced, currently being standardized, and is backward-compatible with LTE.

In this case, the measurement information is based on measurement information and/or protocols as provided at least in a long term evolution standard or 3.9G standard. In this case, a mobile radio standard that is defined more highly than 3.9G or 4G may also be provided for a cellular mobile radio communication network.

Consequently, the base station can acquire measurements which can be restricted for example to measurements such as are defined in the LTE standard or more highly defined standards. This information can then be utilized to average for example an interference map from the geographic location measurements. The corresponding base station can thus perform for example an estimation of an average channel condition, for a corresponding terminal-to-terminal communication.

These measurement values or reports created therefrom may be for example "Signal to Interference plus Noise Ratio" reports, also called SINR reports, RSSI reports or other reports defined in the long term evolution standard or thereabove.

This embodiment has the advantage that measurement data such as are provided on the basis of corresponding LTE protocols and standards based thereon in the cellular mobile radio communication system can be utilized for the learning of the interference map. Consequently, no additional measurements are required, as a result of which resources can be saved.

In accordance with a further exemplary embodiment, the method furthermore comprises the fact that the learning algorithm for a geographic radio signal interference map is implemented on the basis of an adaptive projected subgradient method based algorithm.

Such an algorithm may be based for example on "Interference Identification in Cellular Networks via Adaptive Projected Subgradient methods", and also on "MMSE Interference Estimation in LTE Networks". These two exemplary methods can be used here to form a learning algorithm in this regard. In this case, the first method describes an adaptive projected subgradient approach, for learning methods in diffusion networks, also known as "Adaptive Projected Subgradient Approach to Learning in Diffusion Networks". The second exemplary method can be utilized for the learning algorithm by virtue of the fact that, by utilizing this method, an optimum linear "Minimum Mean Square Error" estimator, also called "MMSE estimator", is utilized in order to generate the geographic radio signal interference map.

This embodiment has the advantage that efficient learning algorithms tailored to cellular mobile radio networks can be utilized in order to be able to generate the interference map.

In accordance with a further exemplary embodiment, the method furthermore comprises the fact that the configuration information regarding the configuration setting is suitable, regarding a terminal-to-terminal communication, for a terminal-to-terminal mobile radio communication terminal and/or a user of the mobile radio communication terminal, for configuring a transmission channel, for increasing a service quality, for compensating for a radio signal interference in this way, for performing a proactive resource allocation and/or for performing a link adaptation.

This embodiment has the advantage that a better communication quality may be achievable.

In accordance with a further exemplary embodiment, the method furthermore comprises the fact that a determination of the configuration setting comprises: ascertaining a total received power at a receiving mobile radio communication terminal, determining a transmitted power for a transmitting mobile radio communication terminal, and ascertaining a channel damping, on the basis of a division of a subtraction of the location-dependent radio signal interference disturbance from the total received power at the receiving mobile radio communication terminal by the transmitted power for the transmitting mobile radio communication terminal. In this case, the transmitting mobile radio communication terminal corresponds to the first mobile radio communication terminal and the receiving mobile radio communication terminal corresponds to the second mobile radio communication terminal.

This embodiment has the advantage that an even better communication quality may be achievable.

In accordance with a further exemplary embodiment, the method furthermore comprises the fact that setting up a terminal-to-terminal communication between the first mobile radio communication terminal and the second mobile radio communication terminal, taking account of the provided configuration information regarding the configuration setting, comprises an adaptability of a modulation, a channel encoding, a signal transmission power and/or an antenna transmission mode to the mobile radio communication terminals participating in the terminal-to-terminal communication.

This embodiment has the advantage that an even better communication quality may be achievable.

In accordance with a further exemplary embodiment, the method furthermore comprises the fact that the terminal-to-terminal communication is designed to be carried out exclusively between the first mobile radio communication terminal and the second mobile radio communication terminal.

Exclusively carrying out a terminal-to-terminal communication within the meaning of the invention can mean here that the terminal-to-terminal communication is additionally carried out exclusively between two subscribers, that is to say takes place without the participation of a base station. The base station here is merely accorded the task, for example, of making a statement about a channel quality condition during the terminal-to-terminal communication, but—in contrast to conventional communication in a cellular mobile radio communication network—not of performing the routing between the subscribers and thus functioning as it were as a man-in-the-middle, that is to say itself forwarding the call and data packets (to the subscribers).

Moreover, the terminal-to-terminal communication can be carried out exclusively between two subscribers or else exclusively between a plurality of subscribers; in other words thus in each case without a direct participation of a base station in the respective communication itself.

This embodiment has the advantage that the actual communication between the terminals manages without a base station.

The invention thus allows the provision of a terminal-to-terminal communication in a cellular mobile radio communication network for at least two mobile radio communication terminals, wherein no base station is necessary for the actual communication between the subscribers. The base station here serves merely to provide a radio signal interference map in order to enable a statement about the channel quality of the radio signal for the terminal-to-terminal communication. As a result, resources can be saved and the D2D communication for C-ITS applications is made possible. The teaching according to the invention obviates complex channel measurements, implementable possibly only with difficulty or not at all, and corresponding measurement protocols for all D2D pairs and cellular mobile radio communication terminals in the cell.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
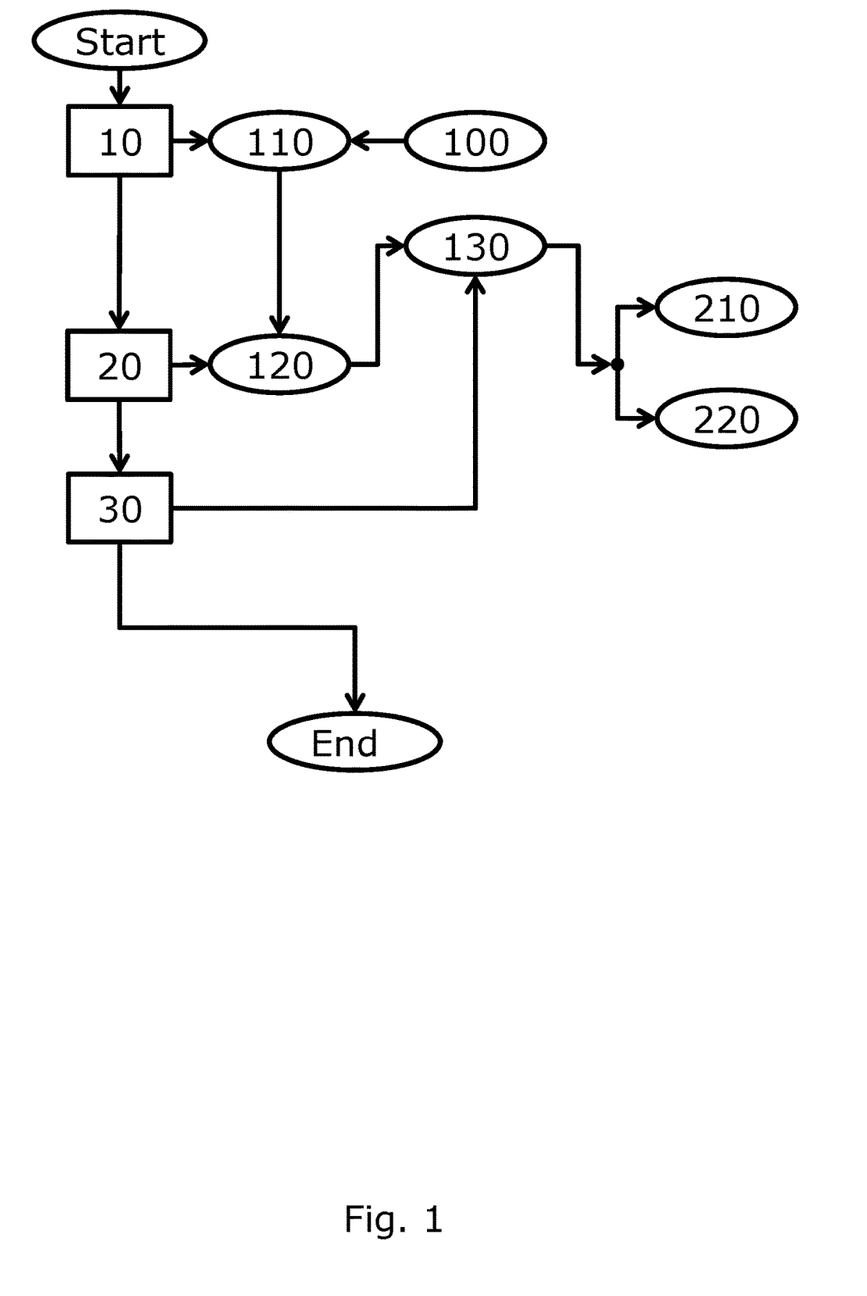
FIG. 1 shows a schematic illustration of a proposed method in accordance with one exemplary embodiment of the invention.

FIG. 1 shows a schematic illustration of a proposed method in accordance with one exemplary embodiment of the invention.

In this case, FIG. 1 shows a schematic illustration of a method for terminal-to-terminal communication in a cellular mobile radio network, wherein the method comprises: providing 110 a radio signal interference map 110. In this case, the radio signal interference map 110 is indicative of a location-dependent radio signal interference disturbance within a coverage area of a base station 100. In this case, the location-dependent radio signal interference disturbance is indicative of a radio signal interference disturbance of a terminal-to-terminal communication 130. The method moreover involves providing the radio signal interference map 110 on the basis of a learning algorithm for a geographic radio signal interference map. Providing 20 configuration information 120 regarding a configuration setting of a radio transmission for a terminal-to-terminal communication 130 between a first mobile radio communication terminal 210 and a second mobile radio communication terminal 220. In this case, providing the configuration information 120 is carried out on the basis of the location-dependent radio signal interference disturbance of the radio signal interference map 110. In this case moreover the configuration setting enables a statement regarding a configuration to be performed in respect of the radio transmission. In addition setting up 30 a terminal-to-terminal communication 130 between the first mobile radio communication terminal 210 and the second mobile radio communication terminal 220, taking account of the provided configuration information 120 regarding the configuration setting.

Mathematically, that can be considered as follows:

The estimation of the geographic radio signal interference map is based on measurements $x_n$, $y_n$ at the point in time n, wherein $x_n \in \mathbb{R}^2$ is the geographic spatial coordinate of the reporting subscriber or user. In this case, $y_n \in \mathbb{R}$ then represents the total measured interference at the coordinate $x_n$. The relationship between $y_n$ and $x_n$ reads $y_n := f(x_n) + \in$, wherein f: $\mathbb{R}^2 \to \mathbb{R}$ represents an unknown function and $\in$ indicates the measurement error.

As considered from a more practically oriented standpoint, what is principally of interest is learning the interference of a set of discrete geographic locations. The latter can be abstracted as pixels of the interference map. Therefore, we can define $V \in \mathbb{R}^{X_1 \times X_2}$ as an interference matrix which maps the geographic coordinates onto a total interference value. Therefore, each element of the matrix can be regarded as an aggregated interference at the corresponding geographic location. On the basis of the current estimation of f, it is possible to find an approximation for $\tilde{V}$. At the point in time t, communication subscribers or communication users in the cell report their measurements, such as RSSI measurements, for example. In this case, not only the D2D communication users but also other mobile radio subscribers can provide reports. These measurements $v(x,t) \in \mathbb{R}$ regarding their current positions $X \in \mathbb{R}^2$ are communicated or reported to the corresponding base station of the cell. As soon as these data reach the base station, they can be utilized by means of a then estimated $\tilde{V}$ for an updating of the true interference matrix V.

Assuming that a D2D subscriber or D2D communication receiver r is able to measure the total received power and to generate a corresponding report, such a report of a D2D communication receiver at the point in time t can be interpreted as:

$$\gamma(t, x_s, x_r) = p_s h_{sr}(t) + V(t, x_r)$$

In this case, $x_s$ is the geographic location of the D2D communication transmitter, $x_r$ is the geographic location of the D2D communication receiver, $p_s$ is the transmission power of the D2D communication transmitter, and $h_{sr}(t)$ is the channel between the two D2D communication subscribers.

One solution approach here may involve utilizing the knowledge about $\tilde{V}(t,x_r)$ and $p_s$ at the base station to obtain an estimated value of the channel $h_{sr}(t)$ as $\overline{h}_{sr}(t)$, where:

$$\overline{h}_{sr}(t) = \frac{\gamma(t, x_s, x_r) - \tilde{V}(t, x_r)}{p_s}$$

Figure 2:
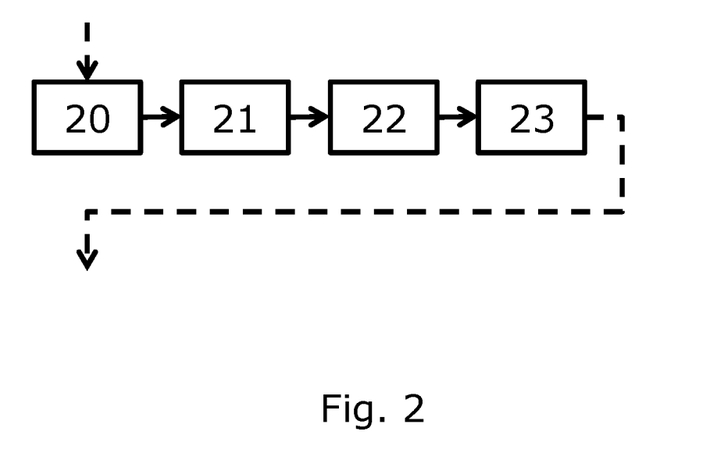
FIG. 2 shows a schematic illustration of a proposed method in accordance with a further exemplary embodiment of the invention.

FIG. 2 shows a schematic illustration of a proposed method in accordance with a further exemplary embodiment of the invention.

In this case, FIG. 2 shows a schematic illustration of a method that has been developed further with respect to FIG. 1. The statements made previously in respect of FIG. 1 therefore also hold true for FIG. 2.

FIG. 2 shows the method from FIG. 1 in which, furthermore, a determination of the channel quality condition regarding the statement about the channel damping comprises: ascertaining 21 a total received power at a receiving mobile radio communication terminal, determining 22 a transmitted power for a transmitting mobile radio communication terminal, and ascertaining 23 the channel damping, on the basis of a division of a subtraction of the location-dependent radio signal interference disturbance from the total received power at the receiving mobile radio communication terminal by the transmitted power for the transmitting mobile radio communication terminal, and in this case the transmitting mobile radio communication terminal corresponds to the first mobile radio communication terminal 210 and the receiving mobile radio communication terminal corresponds to the second mobile radio communication terminal 220.

Figure 3:
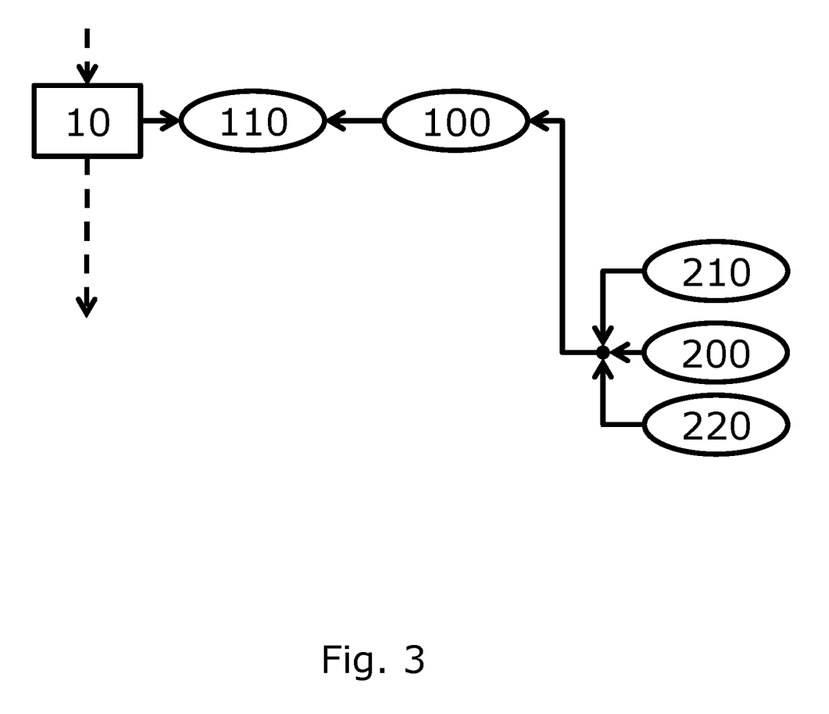
FIG. 3 shows a schematic illustration of a proposed method in accordance with a further exemplary embodiment of the invention.

FIG. 3 shows a schematic illustration of a proposed method in accordance with a further exemplary embodiment of the invention.

In this case, FIG. 3 shows a schematic illustration of a method that has been developed further with respect to FIG. 1. The statements made previously in respect of FIG. 1 therefore also hold true for FIG. 3.

FIG. 3 shows the method from FIG. 1 in which, furthermore, providing 10 the radio signal interference map 110 is carried out on the basis of measurement information from mobile radio communication devices 200, 210, 220 connected to the base station 100. In this case moreover the measurement information is based on measurement information and/or protocols as provided at least in a long term evolution standard or 3.9G standard. In this case, a mobile radio standard defined more highly than 3.9G or 4G for a cellular mobile radio communication network may also be provided.

In order better to distinguish between a mobile radio communication device 200 which is generally connected to a base station and a mobile radio communication device 210, 200 which is utilized for terminal-to-terminal communication 130 in the cellular mobile radio network, the latter mobile radio communication device is called a mobile radio communication terminal 210, 200.

Figure 4:
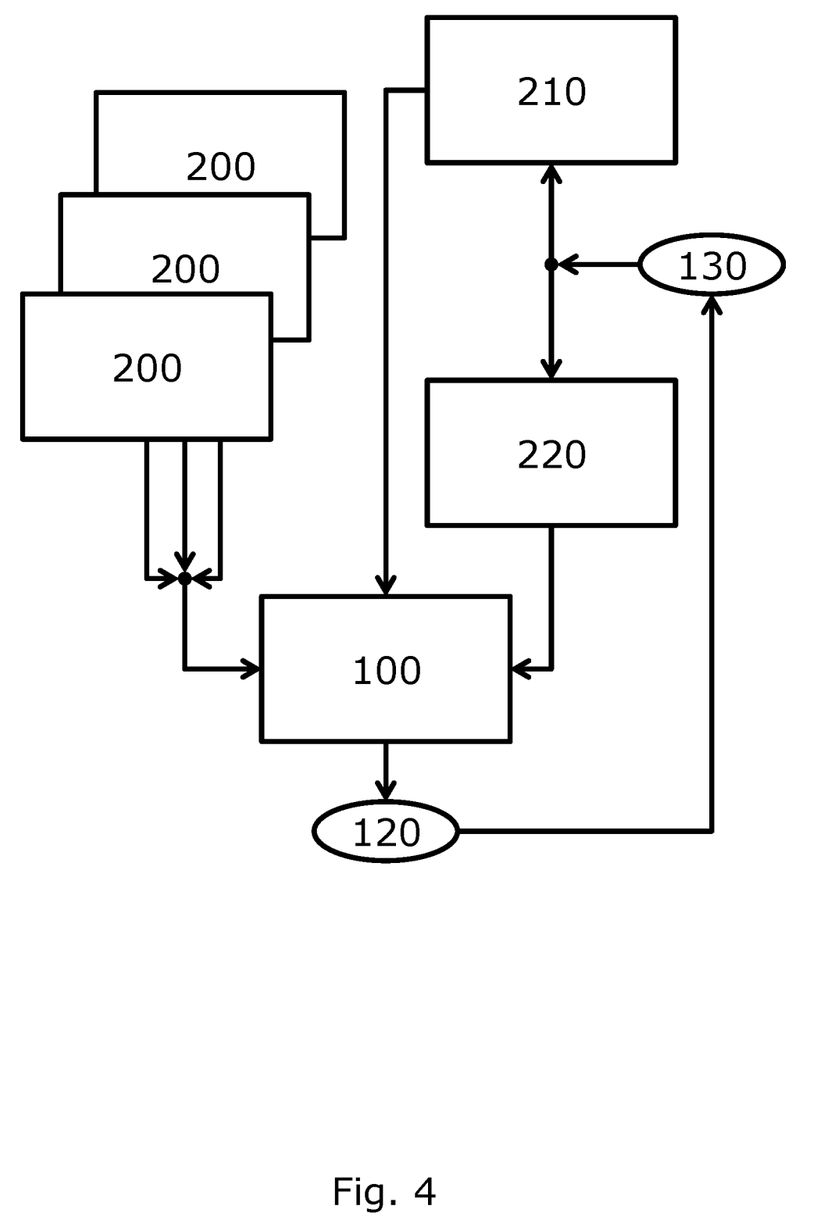
FIG. 4 shows a schematic illustration of a proposed system in accordance with a further exemplary embodiment of the invention.

FIG. 4 shows a schematic illustration of a proposed system for terminal-to-terminal communication 130 in a cellular mobile radio network, in accordance with a further exemplary embodiment of the invention.

As can be gathered from FIG. 4, the system comprises: a base station 100 of a mobile radio system, a first mobile radio communication terminal 210 and a second mobile radio communication terminal 220. In this case, the base station 100 is designed to provide terminal-to-terminal mobile radio communication devices 200, 210, 220 connected to the base station 100 with corresponding information, regarding configuration information 120, regarding a configuration setting of a radio transmission for a terminal-to-terminal communication 130. In this case moreover the system is designed to implement a method according to the invention.

In FIG. 4, by way of example, three further mobile radio communication devices 200 are also illustrated over and above the two mobile radio communication terminals 210, 220. Said mobile radio communication devices do not themselves participate in the terminal-to-terminal communication 130, but transmit their measurement results to the base station 100 in order that the latter can keep the radio signal interference map 110 up to date, and from said map can make the information required for the terminal-to-terminal communication 130 available to the two communication subscribers 210, 220 illustrated in FIG. 4.

One application scenario for such a C-ITS application by means of D2D communication might be for example a truck journey with cars traveling behind the truck on a country road. In this case, the truck may be equipped with a forward-looking video camera, for example for a lane and distance keeping assistance system. In this scenario, the video feed of said camera can then be communicated for example to the car or cars traveling behind the truck via D2D communication, such that the driver or drivers of the car or cars situated behind the truck can see, on their respective internal display by means of the received video feed of the truck camera, what the traffic situation is in front of the truck. As a result, a driver of a car is better able to decide whether he/she ought to initiate a maneuver to overtake the truck or ought better to wait. In this way, accidents can be avoided since important information that has not been available hitherto is available for the overtaking decision.

The concept of the invention can be summarized as follows. A method and a system therefor are provided, whereby it may become possible to provide a D2D communication, also called terminal-to-terminal communication, for a cellular mobile radio communication network. In this case, the base station that is responsible in the cell provides an interference map for its cell. In this case, the measurement data for generating said interference map are provided by mobile radio communication subscribers in the corresponding cell. By means of the interference map generated, a channel interference estimation for the utilized channel of a D2D communication can be made available for the D2D communication subscribers utilizing said channel, such that the D2D communication subscribers can correspondingly adapt their communication. In this case, the D2D communication can be carried out exclusively between the subscribers, without the corresponding base station participating therein.

LIST OF REFERENCE SIGNS

10 Providing a radio signal interference map
20 Providing configuration information regarding a configuration setting of a radio transmission for a terminal-to-terminal communication
21 Ascertaining a total received power at a receiving mobile radio communication terminal
22 Determining a transmitted power for a transmitting mobile radio communication terminal
23 Ascertaining a channel damping
30 Setting up a terminal-to-terminal communication
100 Base station
110 Radio signal interference map
120 Configuration information regarding a configuration setting
130 Terminal-to-terminal communication
200 Mobile radio communication device
210 First mobile radio communication terminal
220 Second mobile radio communication terminal The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for terminal-to-terminal communication in a cellular mobile radio network for a cooperative intelligent transport systems communication, the method comprising the acts of:
   providing a radio signal interference map, wherein the radio signal interference map is indicative of a location-dependent radio signal interference disturbance within a coverage area of a base station, wherein the location-dependent radio signal interference disturbance is indicative of a radio signal interference disturbance of a terminal-to-terminal communication, and wherein providing the radio signal interference map is carried out on the basis of a learning algorithm for a geographic radio signal interference map;
   providing configuration information regarding a configuration setting of a radio transmission for a terminal-to-terminal communication between a first mobile radio communication terminal and a second mobile radio communication terminal, wherein providing the configuration information is carried out on the basis of the location-dependent radio signal interference disturbance of the radio signal interference map, and wherein the configuration setting enables a statement regarding a configuration to be performed in respect of the radio transmission; and
   setting up a terminal-to-terminal communication between the first mobile radio communication terminal and the second mobile radio communication terminal, taking into account of the provided configuration information regarding the configuration setting.

2. The method as claimed in claim 1, wherein providing the radio signal interference map is carried out on the basis of received signal strength indication information.

3. The method as claimed in claim 1, wherein providing the radio signal interference map is carried out on the basis of measurement information from mobile radio communication devices connected to the base station.

4. The method as claimed in claim 2, wherein providing the radio signal interference map is carried out on the basis of measurement information from mobile radio communication devices connected to the base station.

5. The method as claimed in claim 1, wherein the leaning algorithm for a geographic radio signal interference map is implemented on the basis of an adaptive projected subgradient method based algorithm.

6. The method as claimed in claim 2, wherein the leaning algorithm for a geographic radio signal interference map is implemented on the basis of an adaptive projected subgradient method based algorithm.

7. The method as claimed in claim 3, wherein the leaning algorithm for a geographic radio signal interference map is implemented on the basis of an adaptive projected subgradient method based algorithm.

8. The method as claimed in claim 1, wherein the configuration information regarding the configuration setting is suitable to at least one of configure a transmission channel, increase a service quality, compensate for a radio signal interference, perform a proactive resource allocation, and perform a link adaptation.

9. The method as claimed in claim 1, further comprising:
determining the configuration setting by:
ascertaining a total received power at a receiving mobile radio communication terminal,
determining a transmitted power for a transmitting mobile radio communication terminal, and
ascertaining a channel damping, on the basis of a division of a subtraction of the location-dependent radio signal interference disturbance from the total received power at the receiving mobile radio communication terminal by the transmitted power for the transmitting mobile radio communication terminal, wherein the transmitting mobile radio communication terminal corresponds to the first mobile radio communication terminal and the receiving mobile radio communication terminal corresponds to the second mobile radio communication terminal.

10. The method as claimed in claim 1, wherein setting up the terminal-to-terminal communication comprises at least one of an adaptability of a modulation, a channel encoding, a signal transmission power and/or an antenna transmission mode to the mobile radio communication terminals participating in the terminal-to-terminal communication.

11. The method as claimed in claim 1, wherein the terminal-to-terminal communication is carried out exclusively between the first mobile radio communication terminal and the second mobile radio communication terminal.

12. A system for terminal-to-terminal communication in a cellular mobile radio network, the system comprising:
a base station of a mobile radio system,
a first mobile radio communication terminal, and
a second mobile radio communication terminal, wherein the base station is configured to provide terminal-to-terminal mobile radio communication devices connected to the base station with corresponding information, regarding configuration information, regarding a configuration setting of a radio channel for a terminal-to-terminal communication,
wherein the system is configured to:
provide a radio signal interference map, wherein the radio signal interference map is indicative of a location-dependent radio signal interference disturbance within a coverage area of a base station, wherein the location-dependent radio signal interference disturbance is indicative of a radio signal interference disturbance of a terminal-to-terminal communication, and wherein providing the radio signal interference map is carried out on the basis of a learning algorithm for a geographic radio signal interference map,
provide configuration information regarding a configuration setting of a radio transmission for a terminal-to-terminal communication between a first mobile radio communication terminal and a second mobile radio communication terminal, wherein providing the configuration information is carried out on the basis of the location-dependent radio signal interference disturbance of the radio signal interference map, and wherein the configuration setting enables a statement regarding a configuration to be performed in respect of the radio transmission, and
set up a terminal-to-terminal communication between the first mobile radio communication terminal and the second mobile radio communication terminal, taking into account of the provided configuration information regarding the configuration setting.

13. The system as claimed in claim 12, wherein the system is configured to provide the radio signal interference map based on received signal strength indication information.

14. The system as claimed in claim 12, wherein the system is configure to provide the radio signal interference map based on measurement information from mobile radio communication devices connected to the base station.

15. The system as claimed in claim 12, wherein the leaning algorithm for a geographic radio signal interference map is implemented on the basis of an adaptive projected subgradient method based algorithm.

16. A computer program product for a system for terminal-to-terminal communication in a cellular mobile radio network, wherein the computer program product comprises non-transitory computer executable instructions to cause the system to:
provide a radio signal interference map, wherein the radio signal interference map is indicative of a location-dependent radio signal interference disturbance within a coverage area of a base station, wherein the location-dependent radio signal interference disturbance is indicative of a radio signal interference disturbance of a terminal-to-terminal communication, and wherein providing the radio signal interference map is carried out on the basis of a learning algorithm for a geographic radio signal interference map;
provide configuration information regarding a configuration setting of a radio transmission for a terminal-to-terminal communication between a first mobile radio communication terminal and a second mobile radio communication terminal, wherein providing the configuration information is carried out on the basis of the location-dependent radio signal interference disturbance of the radio signal interference map, and wherein the configuration setting enables a statement regarding a configuration to be performed in respect of the radio transmission; and
set up a terminal-to-terminal communication between the first mobile radio communication terminal and the second mobile radio communication terminal, taking into account of the provided configuration information regarding the configuration setting.

* * * * *